S. G. DUGDALE.
Churn.
No. 8,219.  Patented July 15, 1851.
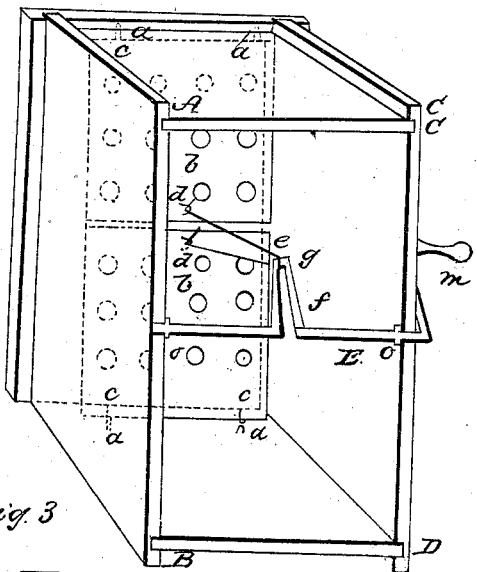
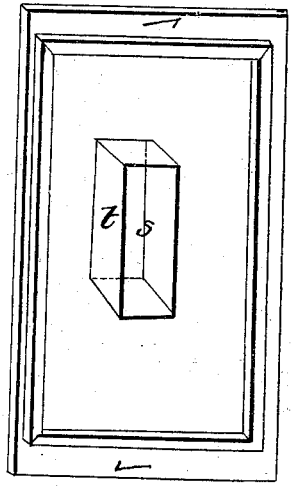
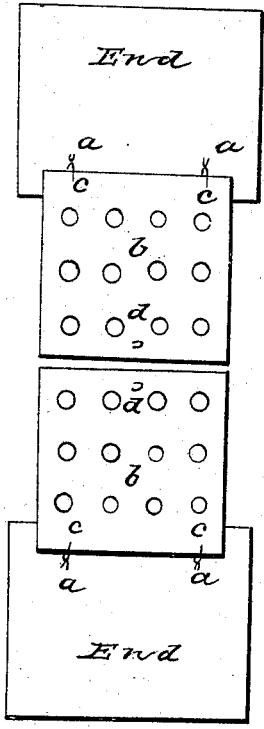
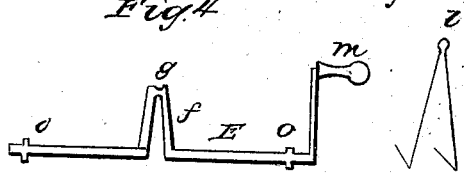

UNITED STATES PATENT OFFICE.

SAML. G. DUGDALE, OF RICHMOND, INDIANA.

CHURN.

Specification of Letters Patent No. 8,219, dated July 15, 1851.

*To all whom it may concern:*

Be it known that I, SAMUEL G. DUGDALE, of the city of Richmond, county of Wayne, and State of Indiana, have invented a new and useful Improvement in Churns; and I do hereby declare that the following is a full, clear, and exact description of the construction and operation of the same, reference being had to the annexed drawings, making a part of this specification, in which—

Figure 1, is a perspective view; Fig. 2, the lid; Figs. 3, 4 and 5, sections.

A, B, C, D, Fig. 1, is a water tight box, 16 inches long, nine inches wide, twelve inches deep.

$a\ a$ are staples, fastened in each end of the box, three inches from the bottom, and parallel with it.

$b\ b$ are dashes, seven inches long, six inches wide, half inch thick. In each are any number of holes, leaving a space of two and a half inches, without holes in the ends attached to the box.

$c\ c$, are hooks driven in the ends of the dashers, to correspond with the staples, $a\ a$, upon which they are hung, from the under side.

$d\ d$, are staples fastened in the opposite ends of the dashers, upon the upper side and parallel with the sides of the box.

E, is a shaft, with a crank $f$, three inches long, having a groove at, $g$, around which is bent an elastic wire, Fig. 5, of sufficient strength, and closed forming an eye at $l$. The opposite ends, eight inches from the eye, are bent at right angles with the staples, $d\ d$, into which they are hooked.

$o\ o$ are collars on the shaft to prevent its slipping.

Grooves are cut in the edges of the box, in which the journals of the shaft work, and are kept down by the lid, Fig. 2.

$s$, is a hole through the lid to admit the crank, $f$, covered by a box, $t$.

The shaft is turned by a handle $m$, or by a pinion attached to a driving wheel.

The box may be made of any suitable size, or form, having the other machinery to correspond.

Having now given a description of the construction of the churn, wherein I apply my improvement, I will proceed to show the nature of said improvement. It consists in having a spring wire, Fig. 5, connecting the crank, with the dashers, in such a manner that it will accommodate itself to the opening and closing of the same, and having a tendency at the same time to draw upon the dashers, keeping the hooks up firmly against the staples by which they are attached to the ends of the churn, thereby preventing them from being displaced by the commotion of the cream. It will be noticed, also, that when the handle is raised perpendicular, the crank to which the wire is attached will be parallel to it, and the ends of the wire attached to the dashers, will be extended, and as the handle is turned from you the springs act upon the dashers tending to force them down, thereby facilitating the operation and allowing the operator to apply his power to the best advantage.

What I claim as my invention and wish to secure by Letters Patent, is—

The application of the spring wire, Fig. 5, which connects the crank with the dashers, in the manner, and, form, and for the purpose, above set forth.

SAMUEL G. DUGDALE.

Witnesses:
ABNER N. NEWTON,
JOHN SAILOR.